(12) United States Patent
Ito

(10) Patent No.: US 8,213,092 B2
(45) Date of Patent: Jul. 3, 2012

(54) ZOOM LENS AND IMAGE PICKUP APPARATUS INCLUDING THE SAME

(75) Inventor: Daisuke Ito, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 86 days.

(21) Appl. No.: 12/941,381

(22) Filed: Nov. 8, 2010

(65) Prior Publication Data
US 2011/0157715 A1   Jun. 30, 2011

(30) Foreign Application Priority Data

Dec. 25, 2009 (JP) ................................. 2009-294301

(51) Int. Cl.
*G02B 15/14* (2006.01)
(52) U.S. Cl. ........ 359/682; 359/680; 359/681; 359/683; 359/684; 359/685; 359/686; 359/715; 359/740; 359/781
(58) Field of Classification Search .......... 359/680–685, 359/715, 740, 781
See application file for complete search history.

(56) References Cited

U.S. PATENT DOCUMENTS

| | | | | |
|---|---|---|---|---|
| 5,710,669 A | | 1/1998 | Endo | |
| 5,774,267 A | * | 6/1998 | Kodama et al. | 359/684 |
| 5,847,875 A | * | 12/1998 | Kodama et al. | 359/684 |
| 6,191,896 B1 | * | 2/2001 | Itoh | 359/689 |
| 6,888,683 B2 | * | 5/2005 | Itoh | 359/686 |
| 7,196,852 B2 | * | 3/2007 | Nishimura | 359/686 |
| 7,388,716 B2 | * | 6/2008 | Yamaguchi et al. | 359/689 |
| 7,639,430 B2 | * | 12/2009 | Shirasuna | 359/686 |
| 2004/0051961 A1 | * | 3/2004 | Itoh | 359/686 |

FOREIGN PATENT DOCUMENTS

JP   2006-208889 A   8/2006

* cited by examiner

*Primary Examiner* — Evelyn A. Lester
(74) *Attorney, Agent, or Firm* — Rossi, Kimms & McDowell LLP

(57) ABSTRACT

Provided is a zoom lens having high optical performance over the entire zoom range. The zoom lens includes a first lens unit having a negative refractive power, a second lens unit having a positive refractive power, a third lens unit having a negative refractive power, and a fourth lens unit having a positive refractive power, which are provided in order from an object side to an image side. During zooming, intervals between the respective lens units change. A focal length (fW) of the entire zoom lens at a wide angle end, a focal length (f3) of the third lens unit, and a movement amount (m2) of the second lens unit during zooming from the wide angle end to a telephoto end are suitably set.

16 Claims, 11 Drawing Sheets

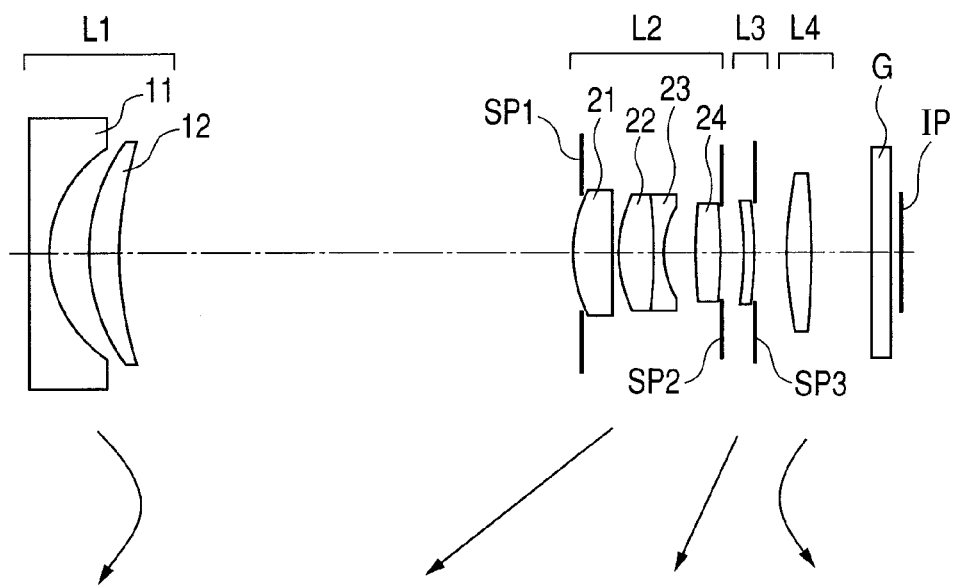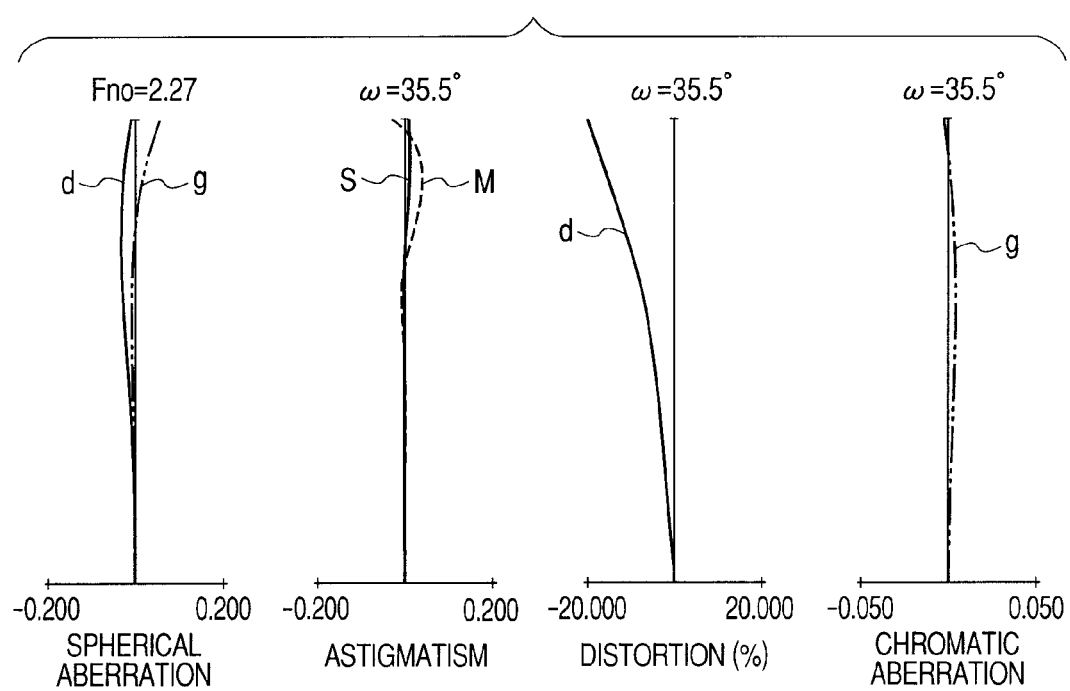

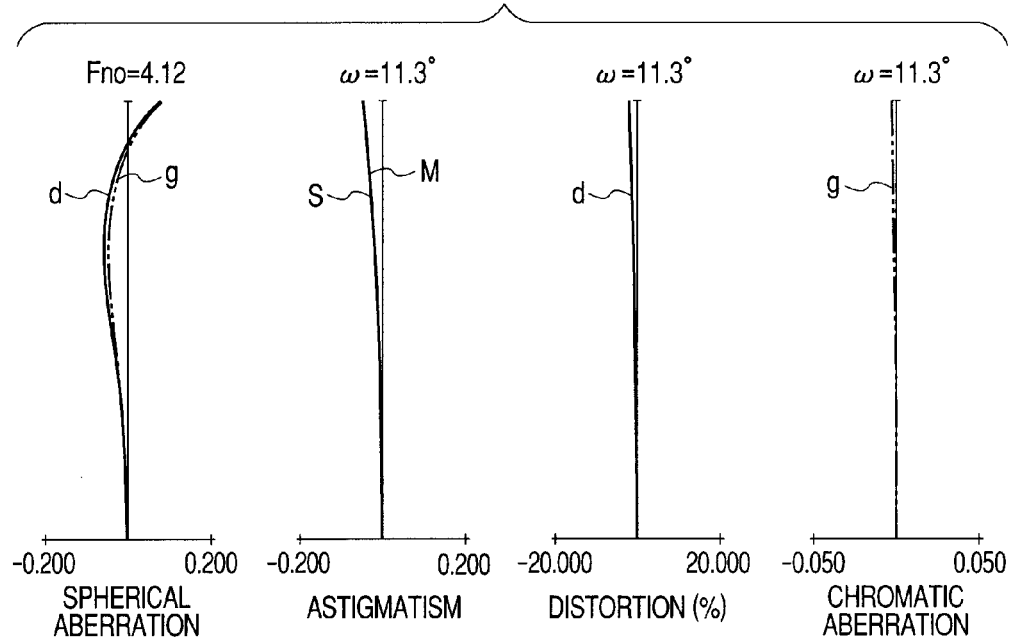
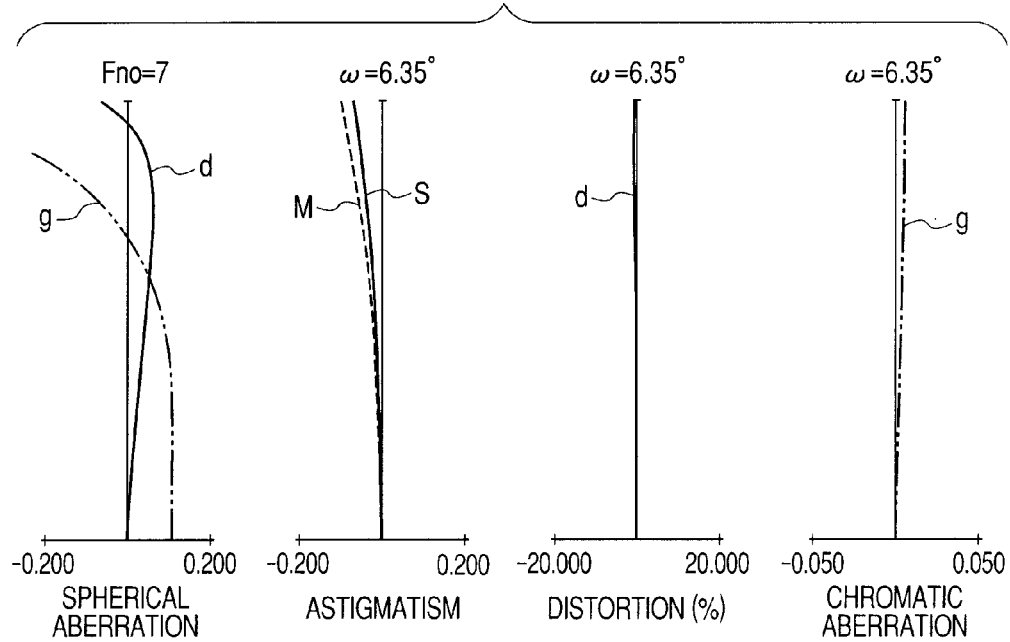

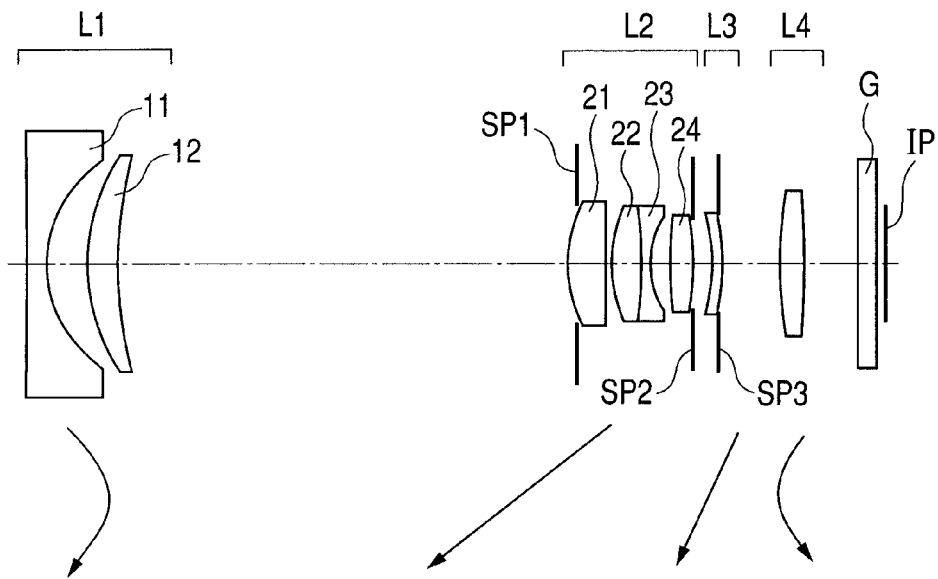
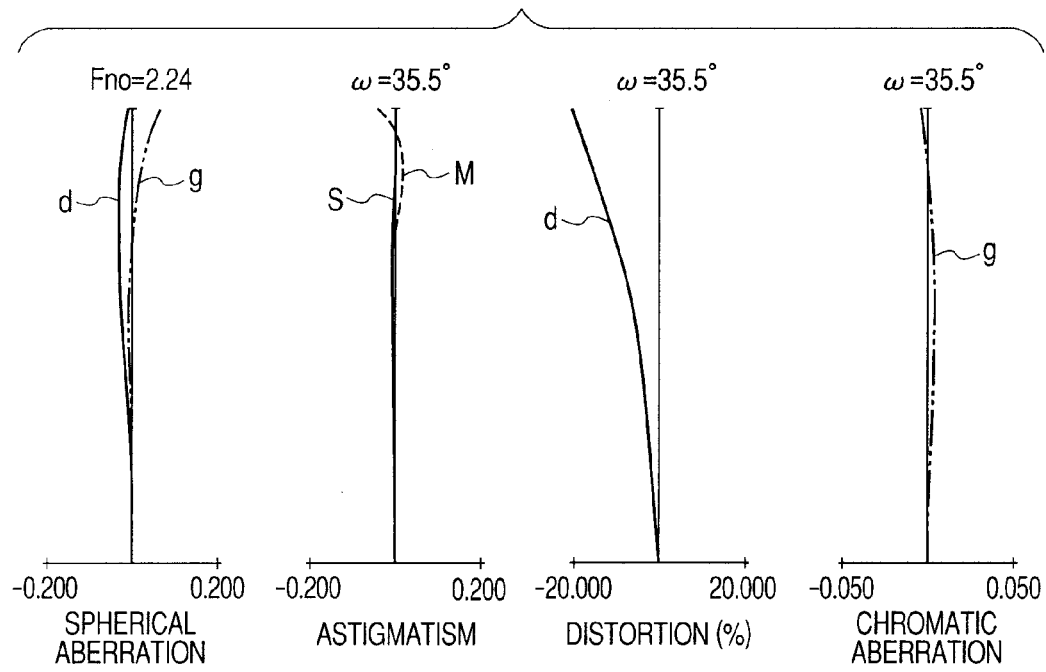

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, and more particularly, to a photographing system for a digital camera, a video camera, a TV camera, a monitoring camera, a silver-halide film camera, and the like.

2. Description of the Related Art

In recent years, an image pickup apparatus (camera) using a solid-state image pickup element, for example, a video camera or a digital still camera has been reduced in size and improved in function. An image pickup optical system used for the image pickup apparatus is required to be a zoom lens which is wide in field angle, high in magnification (high in zoom ratio), large in aperture ratio, and small in size. Such a kind of camera includes various optical members such as a low-pass filter and a color correction filter, which are provided between a rearmost lens and the image pickup element, and hence the image pickup optical system used for the camera is required to have a relatively long back focal length. Further, an image pickup optical system used for a color camera including an image pickup element for color image is expected to have an excellent image-side telecentric characteristic in order to prevent color shading.

There is known a negative lead type zoom lens in which lens units having negative refractive powers are provided on the object side to attain a wide-field angle zoom lens with a relatively long back focal length. A known example of the negative lead type zoom lens is a four-unit zoom lens which includes four lens units with negative, positive, negative, and positive refractive powers in order from the object side to the image side and has a zoom magnification of approximately 5 (Japanese Patent Application Laid-Open No. 2006-208889). There is known another negative lead four-unit zoom lens of the same zoom type, in which respective lens units are moved during zooming (U.S. Pat. No. 5,710,669).

In general, the negative lead type zoom lens is advantageous in achieving a wide field angle but has a significantly asymmetrical lens configuration. Therefore, for example, in the case of the four-unit zoom lens in which the respective lens units move during zooming, aberrations significantly vary because of change in asymmetrical lens configuration, and hence it is very difficult to obtain high optical performance over the entire zoom range. In order to downsize the entire system of the four-unit zoom lens described above and obtain high optical performance over the entire zoom range at the wide field angle, it is important to suitably set the refractive powers of the respective lens units, the lens configuration, and a movement condition of the lens units during zooming. For example, it is important to suitably set a refractive power of a third lens unit which affects a size of a first lens unit and set a movement condition of a second lens unit (serving as main zooming lens unit) during zooming. It is more important to set a lens configuration of the second lens unit and the refractive powers of the respective lens units in a balanced manner.

SUMMARY OF THE INVENTION

A zoom lens of the present invention includes, in order from an object side to an image side: a first lens unit having a negative refractive power; a second lens unit having a positive refractive power; a third lens unit having a negative refractive power; and a fourth lens unit having a positive refractive power, in which intervals between the first lens unit, the second lens unit, the third lens unit, and the fourth lens unit are changed during zooming, and the following conditions are satisfied:

$$4.5 < |f3/fW| < 30.0; \text{ and}$$

$$5.0 < m2/fW < 10.0,$$

where fW indicates a focal length of the entire zoom lens at a wide angle end, f3 indicates a focal length of the third lens unit, and m2 indicates a movement amount of the second lens unit during zooming from the wide angle end to a telephoto end.

According to the present invention, a zoom lens having high optical performance over the entire zoom range is obtained.

Further features of the present invention will become apparent from the following description of exemplary embodiments with reference to the attached drawings.

BRIEF DESCRIPTION OF THE DRAWINGS

FIG. 1 is a lens cross sectional view illustrating Numerical Embodiment 1 at a wide angle end.

FIGS. 2A, 2B, and 2C are aberration diagrams illustrating Numerical Embodiment 1 at the wide angle end, an intermediate zoom position, and a telephoto end.

FIG. 9 is a lens cross sectional view illustrating Numerical Embodiment 5 at the wide angle end.

FIGS. 10A, 10B, and 10C are aberration diagrams illustrating Numerical Embodiment 5 at the wide angle end, the intermediate zoom position, and the telephoto end.

DESCRIPTION OF THE EMBODIMENTS

Hereinafter, exemplary embodiments of the present invention are described in detail with reference to the attached drawings. A zoom lens according to the present invention includes a first lens unit having a negative refractive power, a second lens unit having a positive refractive power, a third lens unit having a negative refractive power, and a fourth lens unit having a positive refractive power, which are provided in order from an object side to an image side. During zooming, intervals between the respective lens units change. To be specific, during zooming from a wide angle end to a telephoto end, the first lens unit moves along a locus convex toward the image side, and the second lens unit and the third lens unit move to the object side. The fourth lens unit moves along a locus convex toward the object side. During focusing from an infinite object to a near object, the fourth lens unit moves to the object side.

Figure 3:
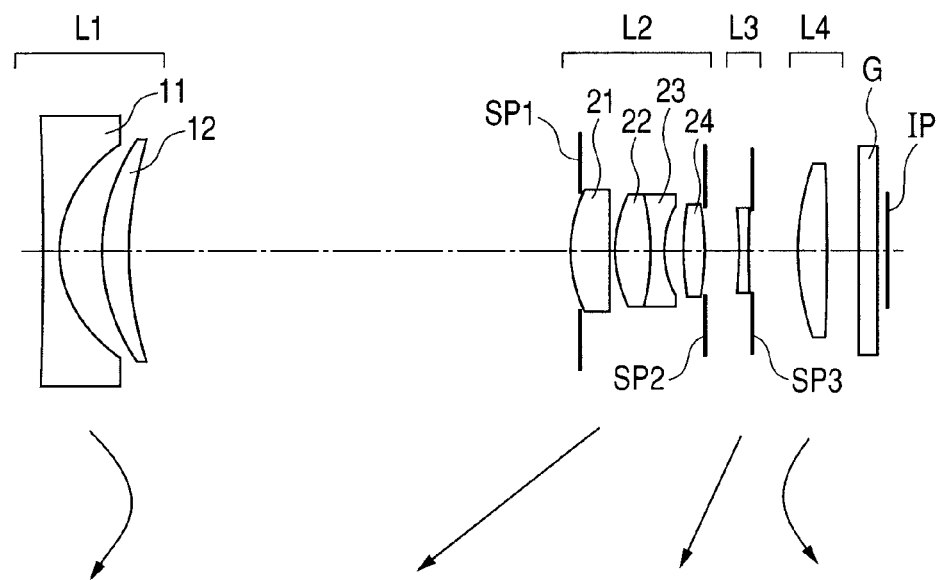
FIG. 3 is a lens cross sectional view illustrating Numerical Embodiment 2 at the wide angle end.
Figure 4A:
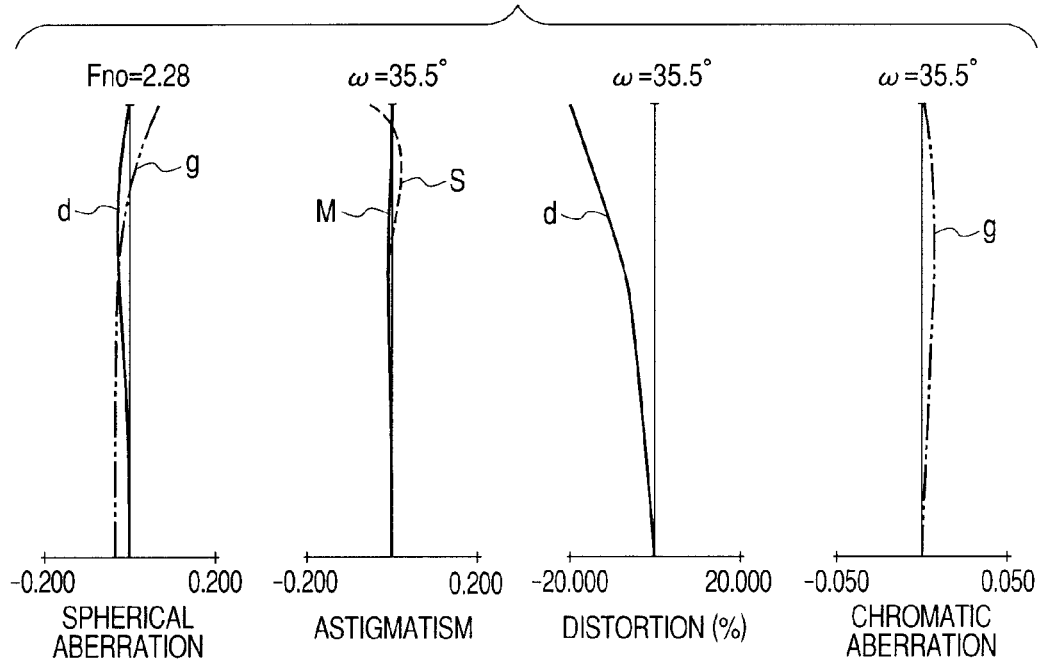
FIGS. 4A, 4B, and 4C are aberration diagrams illustrating Numerical Embodiment 2 at the wide angle end, the intermediate zoom position, and the telephoto end.
Figure 4B:
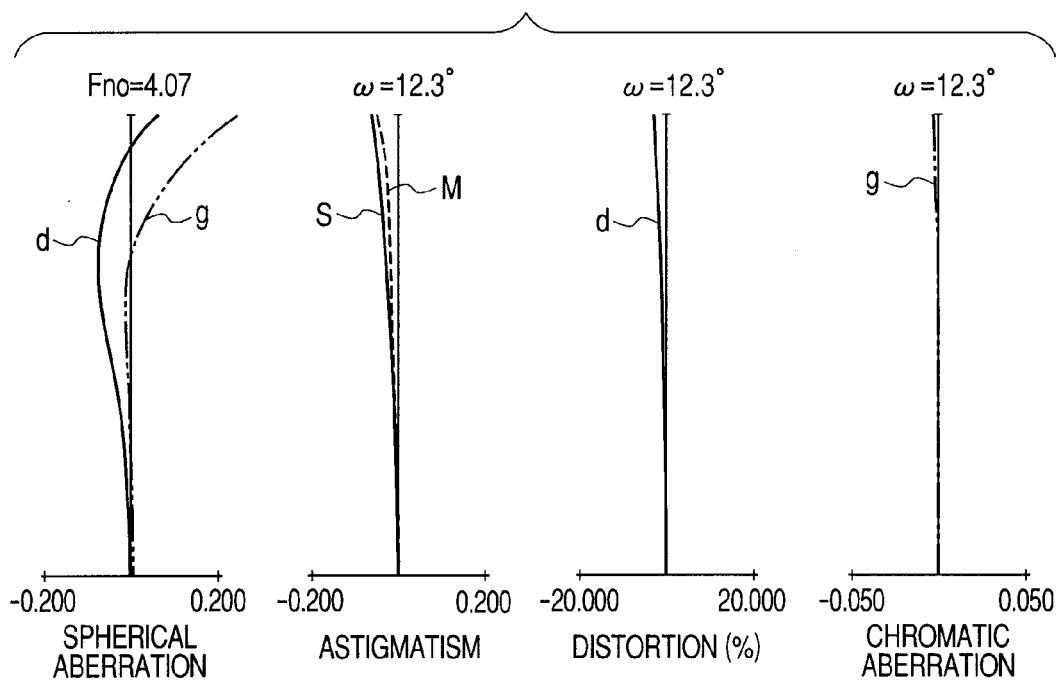
Figure 4C:
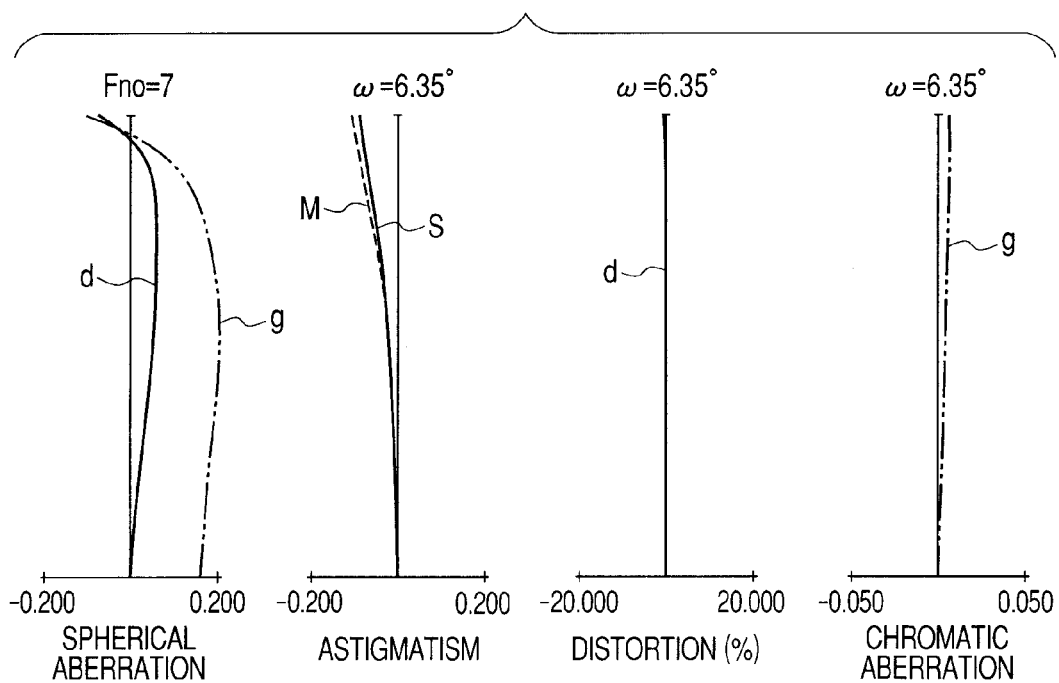

FIG. 1 is a lens cross sectional view illustrating Embodiment 1 at the wide angle end (short focal length end). FIGS. 2A, 2B, and 2C are aberration diagrams illustrating Embodiment 1 at the wide angle end, an intermediate zoom position, and the telephoto end (long focal length end). Embodiment 1 describes a zoom lens having a zoom ratio of 7.5 and an aperture ratio in a range of approximately 2.3 to 7.0. FIG. 3 is a lens cross sectional view illustrating Embodiment 2 at the wide angle end. FIGS. 4A, 4B, and 4C are aberration diagrams illustrating Embodiment 2 at the wide angle end, the intermediate zoom position, and the telephoto end. Embodiment 2 describes a zoom lens having a zoom ratio of 7.5 and an aperture ratio in a range of approximately 2.3 to 7.0.

Figure 5:
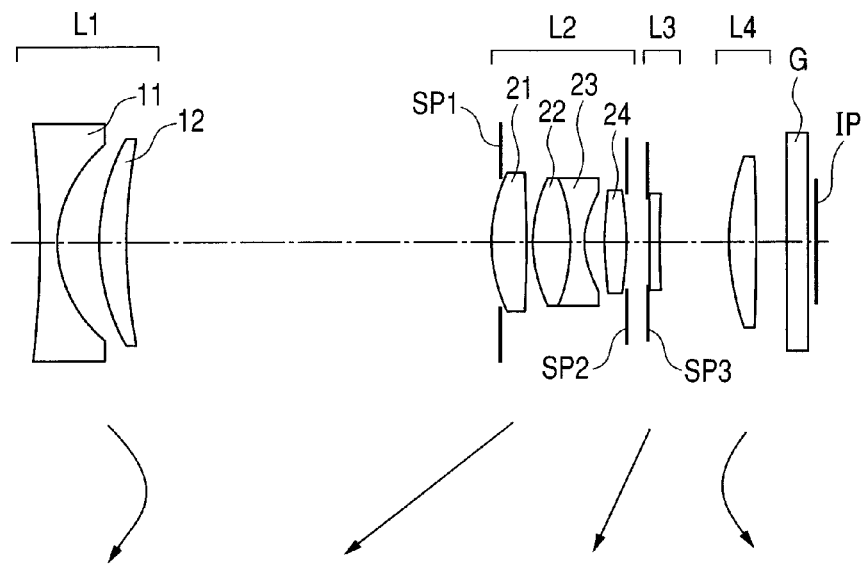
FIG. 5 is a lens cross sectional view illustrating Numerical Embodiment 3 at the wide angle end.
Figure 6A:
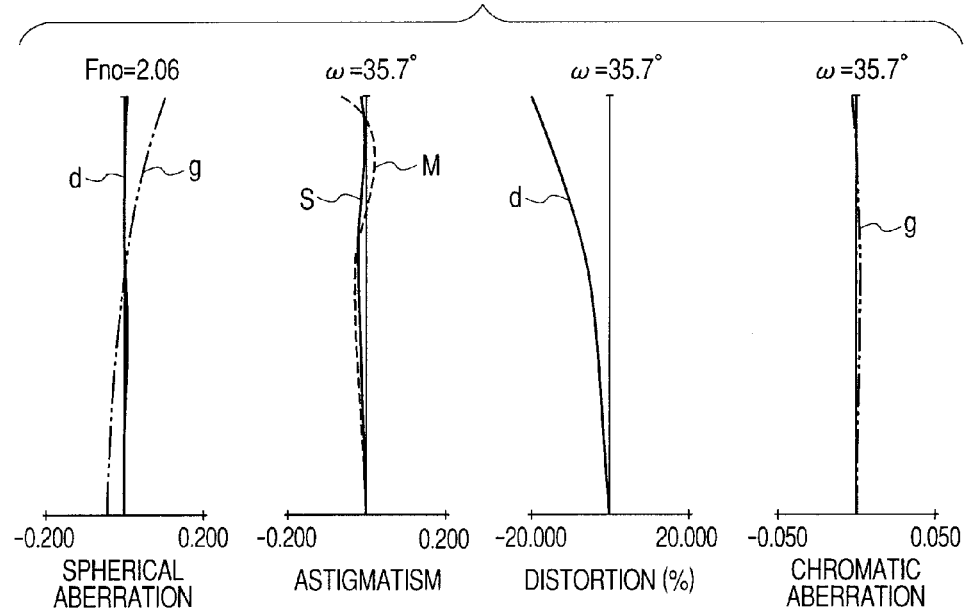
FIGS. 6A, 6B, and 6C are aberration diagrams illustrating Numerical Embodiment 3 at the wide angle end, the intermediate zoom position, and the telephoto end.
Figure 6B:
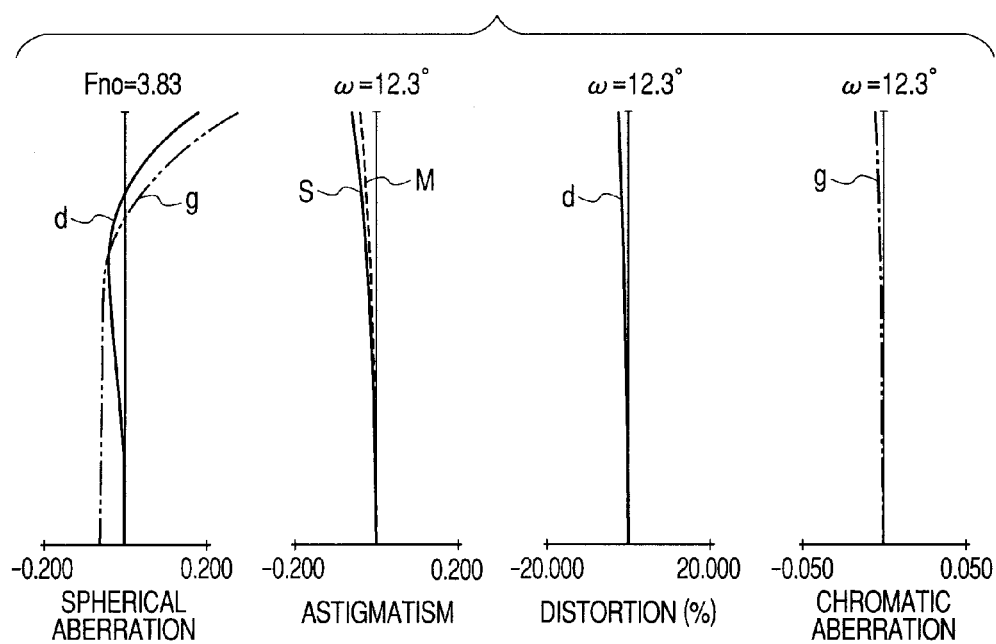
Figure 6C:
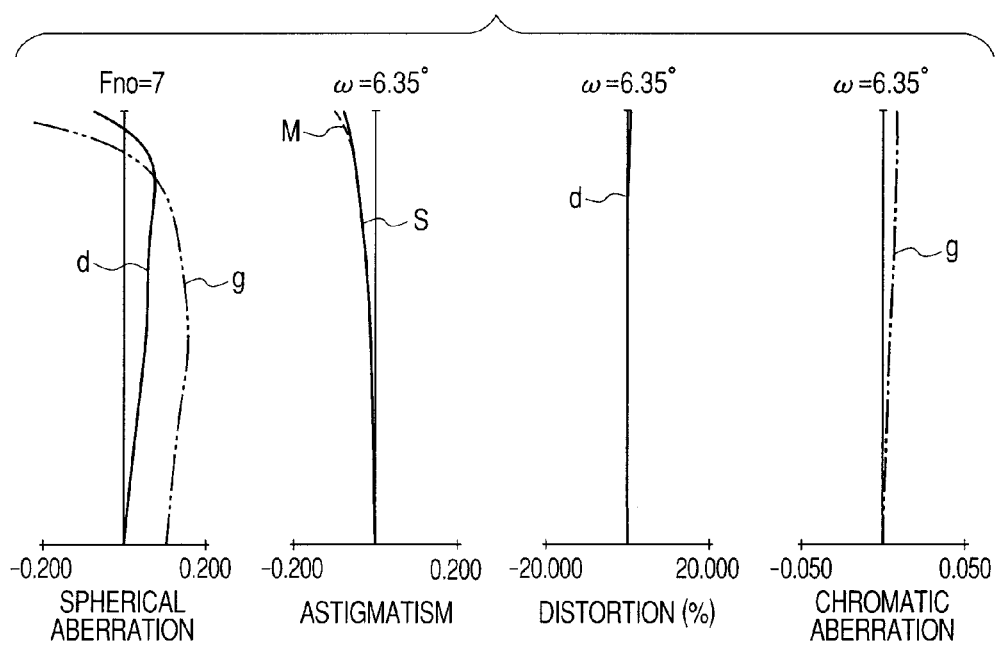
Figure 7:
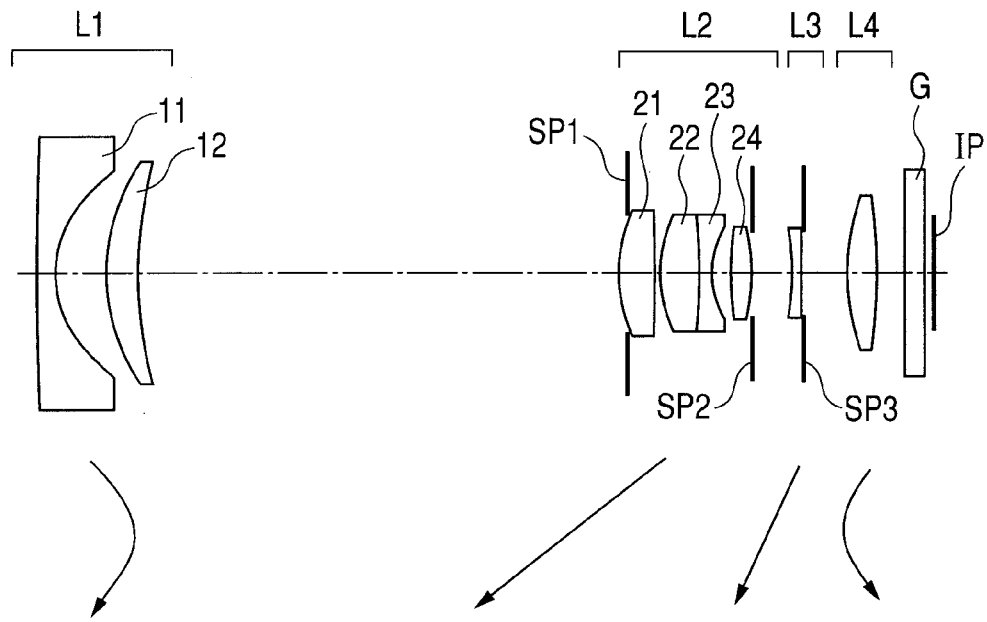
FIG. 7 is a lens cross sectional view illustrating Numerical Embodiment 4 at the wide angle end.
Figure 8A:
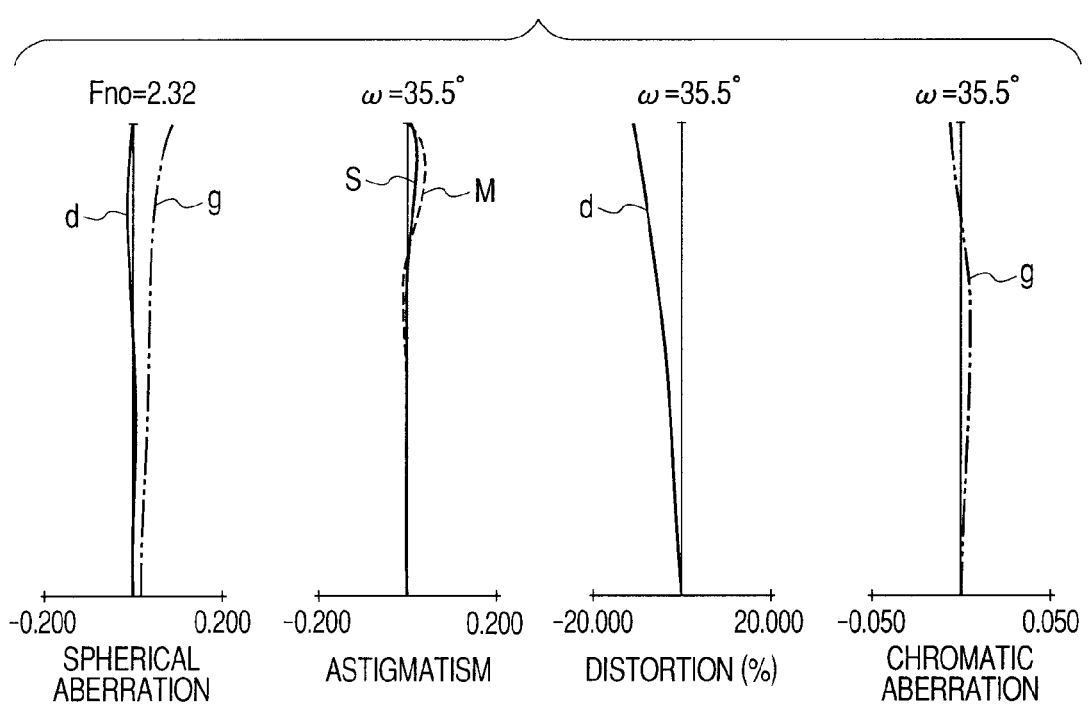
FIGS. 8A, 8B, and 8C are aberration diagrams illustrating Numerical Embodiment 4 at the wide angle end, the intermediate zoom position, and the telephoto end.
Figure 8B:
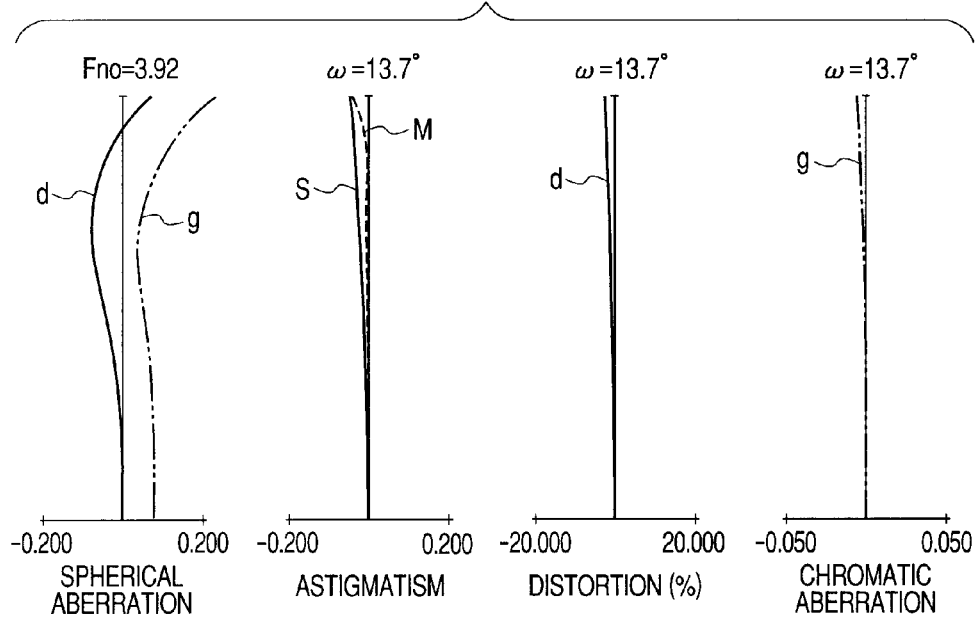
Figure 8C:
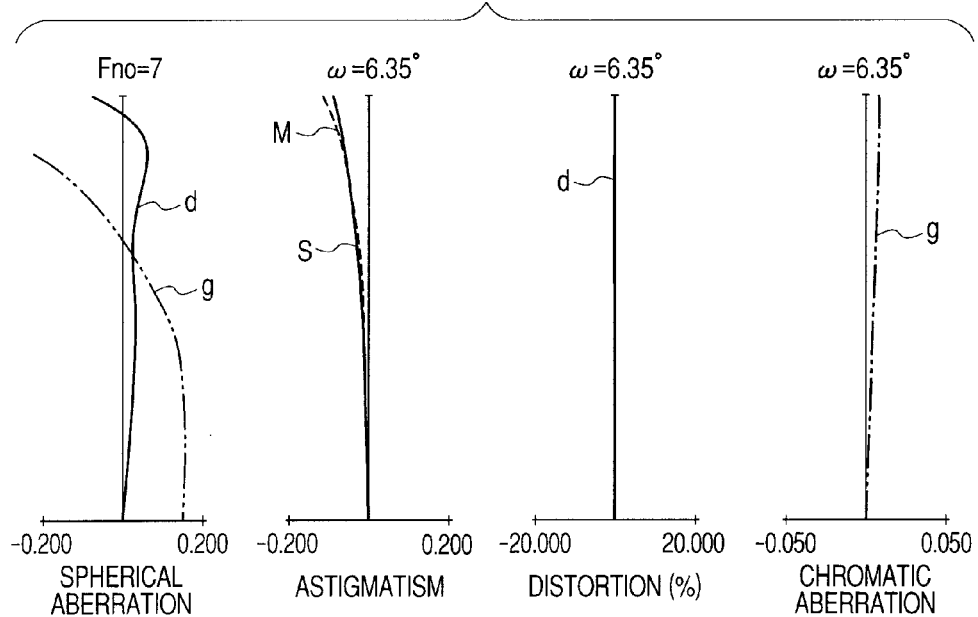

FIG. 5 is a lens cross sectional view illustrating Embodiment 3 at the wide angle end. FIGS. 6A, 6B, and 6C are aberration diagrams illustrating Embodiment 3 at the wide angle end, the intermediate zoom position, and the telephoto end. Embodiment 3 describes a zoom lens having a zoom ratio of 7.5 and an aperture ratio in a range of approximately 2.1 to 7.0. FIG. 7 is a lens cross sectional view illustrating Embodiment 4 at the wide angle end. FIGS. 8A, 8B, and 8C are aberration diagrams illustrating Embodiment 4 at the wide angle end, the intermediate zoom position, and the telephoto end. Embodiment 4 describes a zoom lens having a zoom ratio of 7.5 and an aperture ratio in a range of approximately 2.3 to 7.0.

Figure 10B:
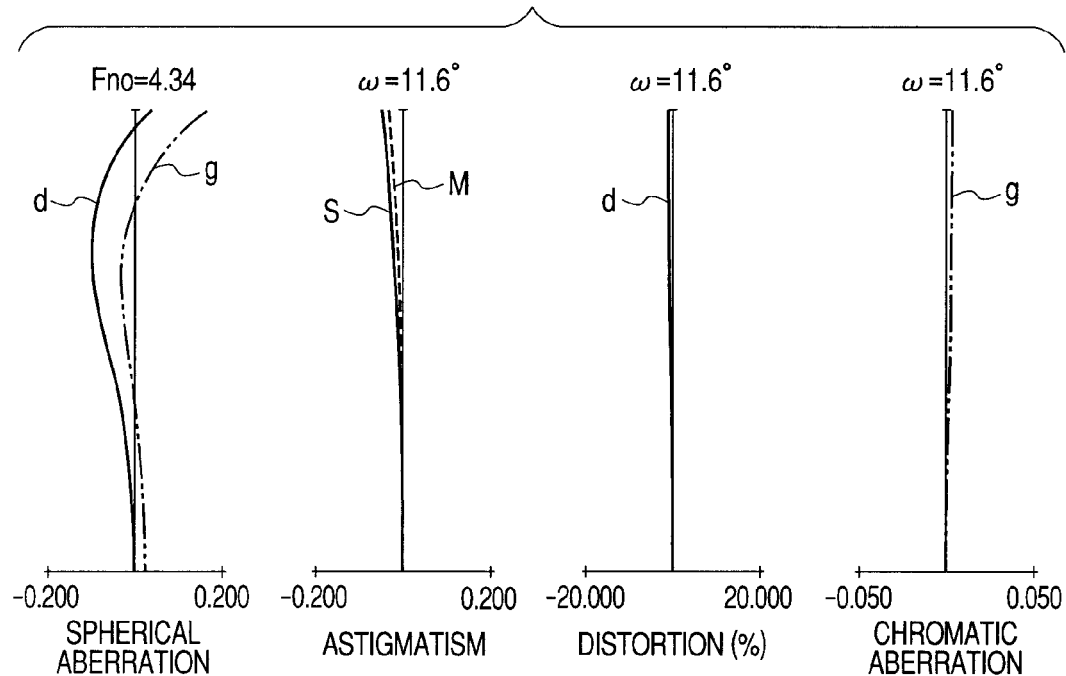
Figure 10C:
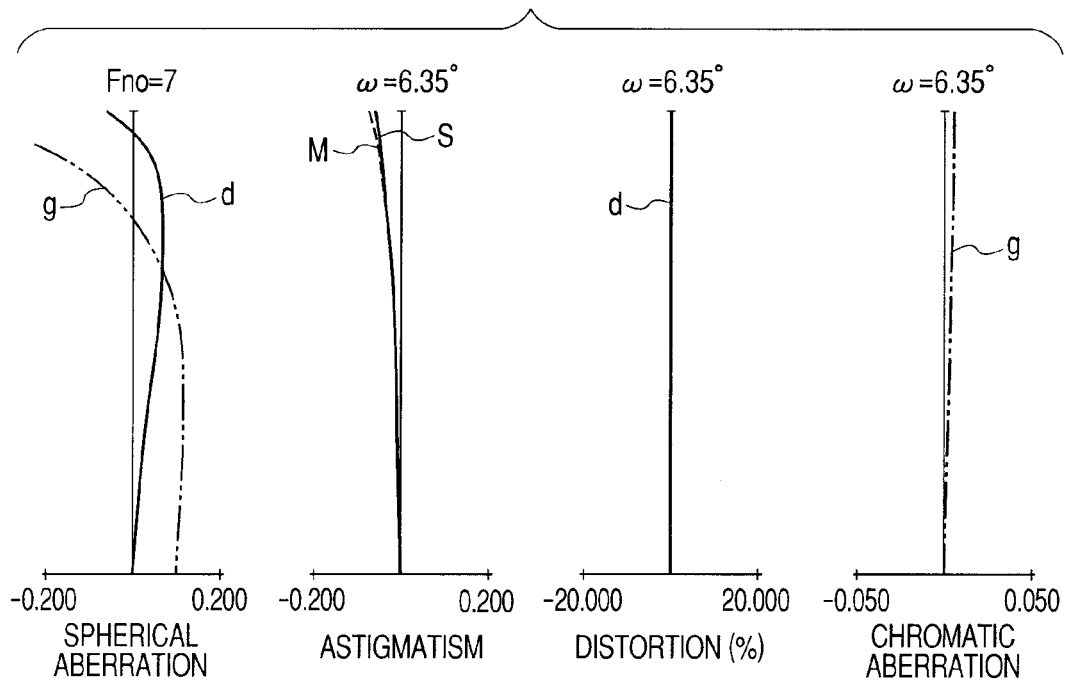
Figure 11:
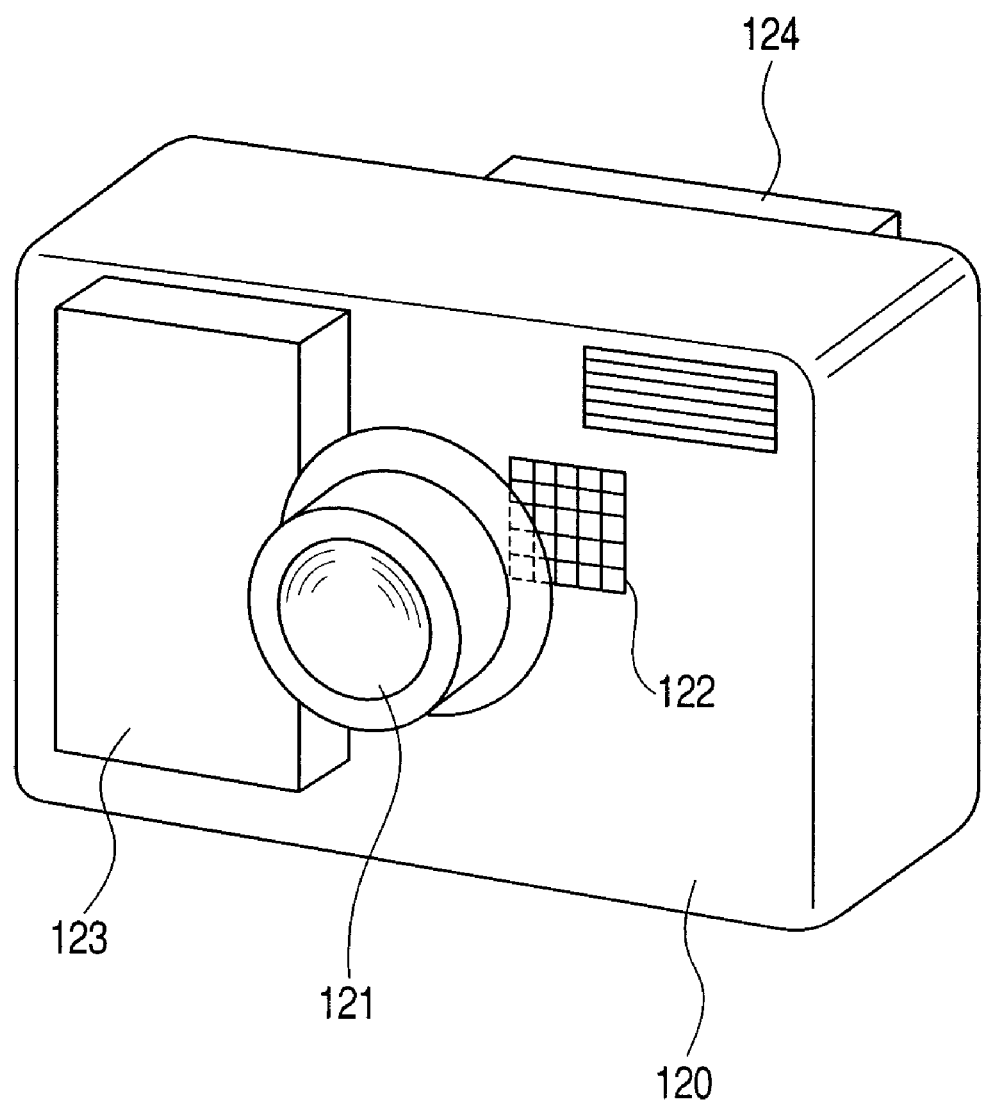
FIG. 11 is a schematic view illustrating a main part of an image pickup apparatus according to the present invention.

FIG. 9 is a lens cross sectional view illustrating Embodiment 5 at the wide angle end. FIGS. 10A, 10B, and 10C are aberration diagrams illustrating Embodiment 5 at the wide angle end, the intermediate zoom position, and the telephoto end. Embodiment 5 describes a zoom lens having a zoom ratio of 7.5 and an aperture ratio in a range of approximately 2.3 to 7.0. FIG. 11 is a schematic view illustrating a main part of a single-lens reflex camera (image pickup apparatus) including the zoom lens according to the present invention.

The zoom lens of each of the embodiments is a photographing lens system (optical system) that is used for an image pickup apparatus such as a video camera, a digital camera, and a silver-halide film camera. In the lens cross sectional views, the left side corresponds to an object side (front side), while the right side corresponds to an image side (rear side). Note that, the zoom lens according to each of the embodiments may be used for a projector. In this case, the left side corresponds to a screen side and the right side corresponds to a projected image side. In the lens cross sectional views, j indicates a lens unit number counted from the object side and Lj indicates a j-th lens unit.

SP1 is an aperture stop (open F number stop). SP2 and SP3 are fixed (non-variable) aperture stops (mechanical stop). A glass block G corresponds to a low-pass filter, a face plate, or the like. As an image plane IP, an imaging plane of a solid-state image pickup element (photoelectric transducer) such as a charge coupled device (CCD) sensor or a complementary metal oxide semiconductor (CMOS) sensor is disposed when the zoom lens is used as a photographing optical system of a video camera or a digital still camera. Alternatively, when the zoom lens is used for a silver-halide film camera, the image plan IP corresponds to the film surface.

In the aberration diagrams, d and g denote a d-line and a g-line, respectively. M and S denote a meridional image plane of the d-line and a sagittal image plane, respectively. Lateral chromatic aberration is expressed by the g-line. Fno denotes an F-number and ω denotes a half field angle. Further, in each embodiment described below, the wide angle end and the telephoto end refer to zoom positions when the lens unit for zooming is positioned at each end of a mechanically movable range along an optical axis.

In the zoom lens of each embodiment, there are provided at least four lens units in order from the object side to the image side, which include the first lens unit L1 having a negative refractive power, the second lens unit L2 having a positive refractive power, the third lens unit L3 having a negative refractive power, and the fourth lens unit L4 having a positive refractive power. During zooming from the wide angle end to the telephoto end, the first lens unit L1 moves along a locus convex toward the image side, the second lens unit L2 moves to the object side, the third lens unit L3 moves to the object side, and the fourth lens unit L4 moves along a locus convex toward the object side.

In the zoom lens according to each of the embodiments, main zooming is performed by the movement of the second lens unit L2 and the third lens unit L3, and a shift of an image plane due to zooming is corrected by the movement of the first lens unit L1 along the locus convex toward the image side and the movement of the fourth lens unit L4 along the locus convex toward the object side. In order to realize a high zoom ratio in a range of approximately 4 to 5, the movement amount of the second lens unit L2 serving as the main zooming unit during zooming needs to be large to some extent so as to satisfy Conditional Expression (2) described later. Ensuring a large movement amount of the second lens unit L2 during zooming may result in a case where the first lens unit L1 and the second lens unit L2 physically interfere with each other. Therefore, in order to prevent the interference, it is necessary to optimize the power of the first lens unit L1 and the power of the second lens unit L2 ((lens power)=(reciprocal of focal length)).

The third lens unit L3 serves to reduce a length of the first lens unit L1, particularly a negative lens 11 of the first lens unit L1, in a diameter direction and reduce the amount of movement of the fourth lens unit L4 during focusing. The power of the third lens unit L3 is suitably set to satisfy Conditional Expression (1) described later, and hence the length in the diameter direction is reduced and variations in aberrations during focusing are suitably suppressed, to thereby realize high performance. The diameter direction is a direction perpendicular to the optical axis. The third lens unit L3 and the fourth lens unit L4 both work against the increase in refractive powers of the respective lens units resulting from the reduction in size of the zoom lens. A refractive power of a short zooming system including the first lens unit L1 and the second lens unit L4 is reduced to suppress aberrations caused by lenses included particularly in the first lens unit L1, to thereby realize excellent optical performance.

The fourth lens unit L4 serves as a field lens to achieve imaging with an excellent image side telecentric characteristic required for an image pickup apparatus using particularly a solid-state image pickup element. The power of the fourth lens unit L4 is changed depending on the power of the third lens unit L3. Therefore, in order to obtain an excellent telecentric characteristic and excellent performance in a compact size, it is necessary to optimally provide the power of the third lens unit L3 and the power of the fourth lens unit L4. In each of the embodiments, the aperture stop SP1 for determining an F number at the wide angle end is provided closer to the image side with respect to an object side vertex of a positive lens 21 of the second lens unit L2 which is located closest to the object side. Therefore, an interval between the first lens unit L1 and the second lens unit L2 at the telephoto end, which is involved in obtaining a higher zoom ratio, is easily minimized in view of mechanical structure, to thereby achieve the reduction in size of the entire system. The mechanical stop SP2 whose aperture diameter is fixed is provided on the image side of the second lens unit L2. The mechanical stop SP3 whose aperture diameter is fixed is provided in the third lens unit L3. Harmful rays affecting the optical performance are cut by the mechanical stops SP2 and SP3.

To be specific, when the diameter increases, many on-axis rays enter the system and many off-axis rays also enter the system up to a height in the diameter direction at which the on-axis rays pass through the system, and hence the off-axis rays cause coma flare and thus affect the optical performance. Therefore, in each of the embodiments, upper rays (ray over optical axis) of the off-axis rays, which adversely affect imaging, are cut by the thus provided mechanical stops SP2 and SP3.

In the zoom lens of each of the embodiments, the following conditions are satisfied:

$$4.5 < |f3/fW| < 30.0 \quad (1)$$

$$5.0 < m2/fW < 10.0 \quad (2)$$

where fW indicates a focal length of the entire zoom lens at the wide angle end, f3 indicates a focal length of the third lens unit L3, and m2 indicates a movement amount of the second lens unit L2 during zooming from the wide angle end to the telephoto end. A sign of the movement amount m2 is negative in a case where the second lens unit L2 moves to the object side at the telephoto end as compared with at the wide angle end, and is positive in a case where the second lens unit L2 moves to the image side at the telephoto end as compared with at the wide angle end.

Next, the technical meanings of Conditional Expressions (1) and (2) are described. Conditional Expressions (1) and (2) are desirable conditions to obtain excellent optical performance by a compact lens structure having a large aperture ratio and a high zoom ratio in the zoom lens according to each of the embodiments. When |f3/fW| exceeds an upper limit value of Conditional Expression (1), the negative refractive power of the third lens unit L3 is too weak. Therefore, an effective diameter of the negative lens 11 of the first lens unit L1 increases, and hence it is difficult to make the system compact. When |f3/fW| is smaller than a lower limit value of Conditional Expression (1), the effective diameter of the negative lens reduces, which is advantageous in making the system compact. However, in this case, the negative refractive power of the third lens unit L3 is too strong, and hence coma increases and thus it is difficult to obtain excellent optical performance.

When m2/fW exceeds an upper limit value of Conditional Expression (2) and the amount of movement of the second lens unit L2 during zooming becomes larger, a total lens length increases, and hence it is difficult to make the entire system compact. When m2/fW is smaller than a lower limit value of Conditional Expression (2) and the amount of movement of the second lens unit L2 during zooming becomes smaller, it is necessary to increase the positive refractive power of the second lens unit L2. Although the increase in power is advantageous in making the entire system compact, it becomes consequently difficult to correct spherical aberration and coma because of the increase in power.

In each of the embodiments, the numerical ranges of Conditional Expressions (1) and (2) should be desirably set as follows.

$$4.505 < |f3/fW| < 26.000 \quad (1a)$$

$$5.3 < m2/fW < 7.3 \quad (2a)$$

In each of the embodiments, a zoom lens which is wide in field angle and has high optical performance over the entire zoom range is obtained by defining the respective elements as described above. In the zoom lens according to each of the embodiments, at least one of the following various conditions should be satisfied in order to obtain excellent optical performance while downsizing the entire lens system with a wide field angle and a high zoom ratio.

Assume that f1 indicates a focal length of the first lens unit L1, f2 indicates a focal length of the second lens unit L2, and f4 indicates a focal length of the fourth lens unit L4. Assume that β2W and β2T indicate imaging magnifications of the second lens unit L2 at the wide angle end and at the telephoto end, respectively. Assume that β3W and β3T indicate imaging magnifications of the third lens unit L3 at the wide angle end and at the telephoto end, respectively. In this case, at least one of the following conditions should be satisfied.

$$0.95 < |f1/f2| < 1.20 \quad (3)$$

$$0.1 < |f2/f3| < 0.8 \quad (4)$$

$$1.0 < |f3/f4| < 4.0 \quad (5)$$

$$2.5 < (\beta 2T \cdot \beta 3W)/(\beta 2W \cdot \beta 3T) < 6.0 \quad (6)$$

Next, the technical meanings of the respective conditional expressions are described. When |f1/f2| is smaller than a lower limit value of Conditional Expression (3) and the positive refractive power of the second lens unit L2 becomes weaker, the amount of movement of the second lens unit L2 increases in order to maintain a predetermined zoom ratio. Therefore, it is difficult to make the entire system compact. When |f1/f2| exceeds an upper limit value of Conditional Expression (3) and the negative refractive power of the first lens unit L1 becomes weaker, the first lens unit L1 and the second lens unit L2 are more likely to physically interfere with each other during zooming. This is not preferable. When |f1/f2| exceeds the upper limit value of Conditional Expression (3) and the positive refractive power of the second lens unit L2 becomes stronger, the number of lenses included in the second lens unit L2 needs to be increased to correct astigmatism and coma. Therefore, it is difficult to make the entire system compact. In addition, it is difficult to correct a field curvature caused by refractive power configuration. This is not preferable. When |f1/f2| is smaller than the lower limit value of Conditional Expression (3) and the negative refractive power of the first lens unit L1 becomes stronger, the interval between the first lens unit L1 and the second lens unit L2 increases. Therefore, it is difficult to make the system compact.

When |f2/f3| exceeds an upper limit value of Conditional Expression (4) and the positive refractive power of the second lens unit L2 becomes weaker, the amount of movement of the second lens unit L2 during zooming increases. Therefore, it is difficult to make the entire system compact. When |f2/f3| exceeds the upper limit value of Conditional Expression (4) and the negative refractive power of the third lens unit L3 becomes stronger, coma occurs conspicuously. Therefore, it is difficult to obtain high performance. When |f2/f3| is smaller than a lower limit value of Conditional Expression (4) and the positive refractive power of the second lens unit L2 becomes stronger, it is necessary to increase the number of lenses in order to correct spherical aberration and coma which are caused in the second lens unit L2. Therefore, the entire system is increased in size. This is not preferable.

When |f3/f4| exceeds an upper limit value of Conditional Expression (5) and the positive refractive power of the fourth lens unit L4 becomes stronger, a curvature of a lens surface of the fourth lens unit L4 becomes too strong, and hence it is difficult to correct the variation in coma caused during zooming. In addition, the telecentric characteristic degrades. This is not preferable. When |f3/f4| is smaller than a lower limit value of Conditional Expression (5) and the positive refractive power of the fourth lens unit L4 becomes weaker, variations in aberration caused during zooming are reduced and the telecentric characteristic is improved. However, the position sensitivity of the fourth lens unit L4 becomes too small. As a result, the amount of movement during focusing increases. When the amount of movement during focusing increases, it is difficult to suppress an increase in size of the mechanical structure and an image plane variation caused during focusing. This is not preferable.

When $(\beta 2T \cdot \beta 3W)/(\beta 2W \cdot \beta 3T)$ exceeds an upper limit value of Conditional Expression (6), a zooming share of the second lens unit L2 becomes too large, and hence the positive refractive power of the second lens unit L2 or the amount of movement of the second lens unit L2 during zooming becomes larger. In the case where the positive refractive power of the second lens unit L2 becomes larger, unless the number of lenses included in the second lens unit L2 is increased, it is difficult to correct spherical aberration and coma. When the amount of movement of the second lens unit L2 becomes larger, it is difficult to make the entire system compact. When $(\beta 2T \cdot \beta 3W)/(\beta 2W \cdot \beta 3T)$ is smaller than a lower limit value of Conditional Expression (6), a zooming share of the third lens unit L3 becomes too large, and hence the negative refractive power of the third lens unit L3 becomes larger. When the negative refractive power of the third lens unit L3 becomes larger, it is difficult to correct coma. In order to correct coma, it is necessary to increase the number of lenses of the third lens unit L3, and hence it is difficult to make the entire system compact. In order to correct aberrations and reduce the size of the entire lens system, the numerical ranges of Conditional Expressions (3) to (6) are more desirably set as follows.

$$0.99 < |f1/f2| < 1.16 \quad (3a)$$

$$0.105 < |f2/f3| < 0.620 \quad (4a)$$

$$1.12 < |f3/f4| < 3.49 \quad (5a)$$

$$2.70 < (\beta 2T \cdot \beta 3W)/(\beta 2W \cdot \beta 3T) < 5.50 \quad (6a)$$

When the respective elements are defined as described above, a zoom lens to be obtained is suitable for a photographing system using a solid-state image pickup element and has excellent optical performance including a wide field angle, a small front lens diameter, a compact size, a high zoom ratio, and a large aperture ratio.

Next, features of the lens structures of the respective lens units in each of the embodiments are described. The first lens unit L1 includes two lenses, that is, the negative lens 11 having a concave surface facing toward the image side and a positive meniscus lens 12 having a concave surface facing toward the image side, which are provided in order from the object side to the image side. The first lens unit L1 serves to cause an off-axis principal ray to enter the center of the aperture stop SP1. The amount of refraction of the off-axis principal ray is large particularly on the wide-angle side, and hence various off-axis aberrations, particularly, astigmatism and distortion are more likely to be caused.

Therefore, in each of the embodiments, as in the case of a general wide-field angle lens system, the negative lens and the positive lens are provided to suppress an increase in diameter of a lens located closest to the object side. An object side lens surface of the negative lens 11 is formed into an aspherical shape having a positive refractive power increasing from the center of the lens to the periphery of the lens, and an image side lens surface thereof is formed into an aspherical shape having a negative refractive power decreasing from the center of the lens to the periphery of the lens. Therefore, astigmatism is excellently corrected to suppress the amount of distortion to an amount which may be electronically corrected. In addition, the number of lenses included in the first lens unit L1 is two, which is small enough to make the entire lens system compact. In order to prevent the off-axis aberrations from being caused by the refraction of the off-axis principal ray, each of the lens surfaces except the object side lens surface of the negative lens 11 included in the first lens unit L1 is formed into a lens shape close to a concentric spherical surface centered around a point of intersection between the aperture stop SP1 and the optical axis.

The object side lens surface of the negative lens 11 is not formed into a shape of the concentric spherical surface centered around the point of intersection between the aperture stop SP1 and the optical axis. The reason is that the negative lens 11 allows distortion up to an amount which may be electronically corrected, but corrects field curvature. The second lens unit L2 includes the positive lens 21 having a convex surface facing toward the object side, a positive lens 22 having a convex surface facing toward the object side, a negative lens 23 having a concave surface facing toward the image side, and a positive lens 24 having each of the both lens surfaces in a convex shape, which are provided in order from an object side to an image side. The positive lens 24 is located closest to the image side. When a large diameter is realized at the wide angle end, an on-axis light beam is maximally enlarged in a diameter direction in the vicinity of the aperture stop SP1 which leads to generation of many aberrations such as particularly spherical aberration and coma. The various aberrations occur when a ray is refracted at a lens surface, and are significantly caused when the ray is greatly refracted. Therefore, the positive lens 21 is provided in a position in which the on-axis ray becomes maximum in the diameter direction after passing through the aperture stop SP1, so that a ray is gently refracted due to the lens shape thereof having a convex surface facing toward the object side and the refractive power ((optical power)=(reciprocal of focal length)) thereof which is suitably set to thereby reduce the generation of various aberrations. Both surfaces of the positive lens 21 are each formed into an aspherical shape to effectively correct particularly spherical aberration.

In each of the embodiments, the object side lens surface of the positive lens 21 which is located closest to the object side in the second lens unit L2 is formed into an aspherical shape having a positive refractive power decreasing from the center of the lens to the periphery of the lens, to thereby excellently correct spherical aberration and coma. The positive lens 22 having a convex surface facing toward the object side is provided on the image side of the positive lens 21 to share the positive refractive power. Spherical aberration and coma which are caused by refraction in the positive lenses 21 and 22 are corrected by an image side surface of the negative lens 23 which is formed into a lens shape having a concave surface facing toward the image side to refract a ray to an opposite side. A light beam diverged by the negative lens 23 is converged by the positive lens 24 having each of both surfaces in a convex shape, to thereby excellently correct spherical aberration and coma which are caused in the entire second lens unit L2.

The negative refractive power of the third lens unit L3 serves to reduce a length of the first lens unit L1 in the diameter direction. The length of the first lens unit L1 in the diameter direction is determined based on a passing position of an outermost off-axis ray at the wide angle end.

A generally-known wide-field angle zoom lens has a lens structure which includes a first lens unit having a negative refractive power, a stop, a second lens unit having a positive refractive power, and a third lens unit having a positive refractive power. In the structure, the outermost off-axis ray follows a path, from the image side to the object side, that passes through the lens unit having a positive refractive power, the lens unit having a positive refractive power, and the stop, which are located in the stated order. The two lens unit each having a positive refractive power are successively located from the image side, and hence the outermost off-axis ray is greatly refracted and greatly deviated from the optical axis in the diameter direction when the ray passes through the first lens unit L1. Therefore, the lens diameter of the negative lens 11 increases.

In contrast, each of the embodiments has a lens structure which includes the first lens unit L1 having a negative refractive power, the second lens unit L2 having a positive refractive power, the aperture stop SP1, the third lens unit L3 having a negative refractive power, and the fourth lens unit L4 having a positive refractive power. In the structure, the outermost off-axis ray follows a path, from the image side to the object side, that passes through the lens unit having a positive refractive power, the lens unit having a negative refractive power, the lens unit having a positive refractive power, and the stop SP1, which are located in the stated order.

When the outermost off-axis ray passes through the lens unit having a positive refractive power and the lens unit having a negative refractive power in order from the image side, the outermost off-axis ray passes through a position away from the optical axis in the diameter direction. Therefore, the outermost off-axis ray passing through the negative lens 11 passes through a position closer to the optical axis as compared to the case where the third lens unit L3 having the negative refractive power is not provided, and hence the effective diameter of the negative lens 11 may be reduced.

According to each of the embodiments, the respective elements are set as described above, to thereby realize a zoom lens which is suited particularly for a photographing system using a solid-state image pickup element. The zoom lens is compact in size having a small number of constituent lenses, and is suited particularly for a collapsible zoom lens, having excellent optical performance including a zooming ratio in a range of approximately 7.0 to 8.0. According to each of the embodiments, the aspherical surface is effectively introduced to the first lens unit and the second lens unit. The refractive power of the first lens unit and the refractive power of the second lens unit are suitably set, to thereby obtain a zoom lens capable of effectively correcting various off-axis aberrations, particularly, astigmatism and distortion, and spherical aberration and coma in the case of the high zoom ratio and the large aperture ratio. The third lens unit L3 includes a single negative lens having the concave surface facing toward the object side, and serves to improve the position sensitivity of the fourth lens unit L4. When the position sensitivity of the fourth lens unit L4 is improved, there is produced an effect of reducing the amount of movement during focusing from the infinite object to the near object, and hence variations in aberrations to be caused during focusing are easily suppressed.

When the negative refractive power of the third lens unit L3 is enhanced, the effective diameter of the first lens unit L1 increases and the position sensitivity of the fourth lens unit L4 becomes larger, and hence it is advantageous to reduce the size of the entire system. However, simultaneously therewith, the positive refractive power of the fourth lens unit L4 is increased, and hence the ray is greatly refracted by the fourth lens unit L4. Therefore, the optical performance and the telecentric characteristic are degraded. The negative refractive power of the third lens unit L3 needs to be optimized to full within a certain range. In order to realize the reduction in size in a collapsible state, the third lens unit L3 includes a single negative lens.

The fourth lens unit L4 includes the positive lens having a convex surface on the object side, and moves along the locus convex toward the object side during zooming from the wide angle end to the telephoto end. During focusing from the infinite object to the near object, the fourth lens unit L4 is moved to the object side. When the zoom ratio increases, spherical aberration and off-axis coma to be caused during zooming greatly vary due to the increase in zoom ratio. In each of the embodiments, the fourth lens unit L4 is moved along the locus convex toward the object side, to thereby excellently correct the aberrations particularly in a range from the wide angle end to the intermediate zoom position located on the telephoto end side.

Next, an example of a digital camera (image pickup apparatus) using the zoom lens according to the present invention as an image pickup optical system is described with reference to FIG. 11. In FIG. 11, the digital camera includes a digital camera main body 120, a photographing optical system 121 including the zoom lens according to any of the embodiments described above, an image pickup element (photoelectric transducer) 122 including a CCD or the like, a recording unit 123, and a finder 124. The image pickup element 122 receives a subject image formed by the image pickup optical system 121. The recording unit 123 records the subject image received by the image pickup element 122. The finder 124 is used to observe the subject image displayed on a display device (not shown). The display device includes, for example, a liquid crystal panel, and the subject image formed on the image pickup element 122 is displayed thereon. A liquid crystal display panel 125 having the same function as the finder is further provided. Therefore, when the zoom lens according to the present invention is applied to an image pickup apparatus such as a digital camera, there may be realized an image pickup apparatus which is small in size and has high optical performance.

Next, Numerical Embodiments 1 to 5 corresponding to Embodiments 1 to 5 of the present invention are described. In the numerical embodiments, "i" indicates a surface number counted from the object side, ri indicates a curvature radius of an i-th lens surface, and di indicates a sum of a lens thickness and an air interval between the i-th surface and an (i+1)-th surface. In addition, nd1 and vdi each indicate a refractive index with respect to the d-line and an Abbe number with respect to the d-line, respectively. Each of two surfaces closest to the image side is formed of a glass material such as a face plate. Further, k, A4, A6, A8, and A10 indicate aspherical coefficients. When "x" denotes a displacement in the optical axis direction relative to a surface vertex at a position corresponding to a height h from the optical axis, an aspherical shape is defined by the following conditional expression:

$$x=(h^2/R)/[1+\{1-(1+k)(h/R)^2\}^{1/2}]+A4h^4+A6h^6+A8h^8+A10h^{10},$$

where R indicates a curvature radius.

In each of the numerical embodiments, the reason why a value of an interval d5 is negative is that the aperture stop SP1 and a lens surface of the second lens unit L2 which is located closest to the object side are counted in order from the object side to the image side. The reason why a value of an interval d15 in Numerical Embodiment 5 is negative is that the lens of the third lens unit L3 and the mechanical stop SP2 are counted in order from the object side to the image side. In each of the numerical embodiments, a back focus (BF) is expressed as an equivalent air length corresponding to a distance between a final surface (glass block surface) and a paraxial image plane. A total lens length is obtained by adding the back focus to a distance between a lens surface closest to the object side and the final surface. Table 1 shows relationships between the conditional expression described above and each value in the respective numeral embodiments. In each of the numerical embodiments, the glass block G is counted as one unit. Therefore, in each of the numerical embodiments, the total number of lens units is larger than the actual number of lens units by one.

Numerical Embodiment 1

Unit: mm
Surface data

| Surface No. | r | d | nd | vd |
|---|---|---|---|---|
| 1* | −196.035 | 1.30 | 1.84862 | 40.0 |
| 2* | 7.333 | 2.61 | | |
| 3 | 12.234 | 2.00 | 1.94595 | 18.0 |
| 4 | 22.200 | (Variable) | | |
| 5 (Stop) | (SP1) ∞ | −0.60 | | |
| 6* | 9.518 | 2.60 | 1.76414 | 49.0 |
| 7* | 214.141 | 0.39 | | |
| 8 | 8.427 | 2.35 | 1.80400 | 46.6 |
| 9 | −22.459 | 0.60 | 2.00330 | 28.3 |
| 10 | 5.869 | 2.09 | | |
| 11 | 23.556 | 1.70 | 1.74400 | 44.8 |
| 12 | −27.683 | 0.00 | | |
| 13 (SP2) | ∞ | (Variable) | | |
| 14 | −20.085 | 0.65 | 1.70154 | 41.2 |
| 15 | −44.834 | 0.00 | | |
| 16 (SP3) | ∞ | (Variable) | | |
| 17 | 22.890 | 1.65 | 1.60311 | 60.6 |
| 18 | −52.715 | (Variable) | | |
| 19 | ∞ | 1.30 | 1.51633 | 64.1 |
| 20 | ∞ | 0.64 | | |
| Image plane | ∞ | | | |

Aspherical surface data
First surface

K = 2.54808e+002  A4 = 3.16526e−005  A6 = −2.85365e−007
A8 = 1.39460e−009  A10 = 6.76120e−012

Second surface

K = −1.44612e+000  A4 = 3.27979e−004  A6 = −4.91455e−007
A8 = 4.70003e−009  A10 = 5.68713e−011

Sixth surface

K = 2.68863e−001  A4 = −7.05822e−005  A6 = 7.96025e−009
A8 = 6.29756e−008  A10 = 1.77980e−009

Seventh surface

K = −6.28353e+001  A4 = 4.94545e−005  A6 = 1.22402e−006
A8 = 1.49709e−007  A10 = 1.19362e−009

Various data
Zoom ratio 7.52

| | Wide angle | Intermediate | Telephoto |
|---|---|---|---|
| Focal length | 4.63 | 18.39 | 34.80 |
| F number | 2.27 | 4.12 | 7.00 |
| Field angle | 35.48 | 11.90 | 6.35 |
| Image height | 3.30 | 3.88 | 3.88 |
| Total lens length | 57.32 | 47.55 | 61.86 |
| BF | 0.64 | 0.64 | 0.64 |
| d4 | 30.44 | 4.04 | 1.72 |
| d13 | 1.47 | 8.19 | 15.29 |
| d16 | 2.16 | 6.59 | 20.60 |
| d18 | 3.98 | 9.46 | 4.98 |

Zoom lens unit data

| Unit | First surface | Focal length |
|---|---|---|
| 1 | 1 | −13.24 |
| 2 | 5 | 12.93 |
| 3 | 14 | −52.43 |
| 4 | 17 | 26.68 |
| 5 | 19 | ∞ |

Numerical Embodiment 2

Unit: mm
Surface data

| Surface No. | r | d | nd | vd |
|---|---|---|---|---|
| 1* | −118.886 | 1.00 | 1.80604 | 40.8 |
| 2* | 7.076 | 2.80 | | |
| 3 | 12.685 | 1.80 | 1.92286 | 18.9 |
| 4 | 24.113 | (Variable) | | |
| 5 (Stop) | (SP1) ∞ | −0.60 | | |
| 6* | 9.879 | 2.50 | 1.84862 | 40.0 |
| 7* | 198.174 | 0.38 | | |
| 8 | 8.427 | 2.40 | 1.71999 | 50.2 |
| 9 | −12.929 | 0.90 | 2.00330 | 28.3 |
| 10 | 6.021 | 1.30 | | |
| 11 | 19.416 | 1.40 | 1.77250 | 49.6 |
| 12 | −17.011 | 0.00 | | |
| 13 (SP2) | ∞ | (Variable) | | |
| 14 | −21.922 | 0.65 | 1.88300 | 40.8 |
| 15 | 124.435 | 0.20 | | |
| 16 (SP1) | ∞ | (Variable) | | |
| 17 | 15.316 | 2.00 | 1.77250 | 49.6 |
| 18 | −135.554 | (Variable) | | |
| 19 | ∞ | 1.30 | 1.51633 | 64.1 |
| 20 | ∞ | 0.64 | | |
| Image plane | ∞ | | | |

Aspherical surface data
First surface

K = 5.43070e+001  A4 = 2.85728e−005  A6 = −7.75299e−007
A8 = 1.27376e−008  A10 = −5.75230e−011

Second surface

K = −1.40240e+000  A4 = 3.28733e−004  A6 = −2.18746e−006
A8 = 3.99269e−008  A10 = −5.53763e−011

Sixth surface

K = 6.47004e−002  A4 = −6.81213e−005  A6 = −6.59240e−008
A8 = −4.99637e−008  A10 = −1.12981e−009

-continued

Seventh surface

K = −1.61648e+003    A4 = −2.27104e−005    A6 = −1.12663e−006
A8 = −4.72041e−009   A10 = −3.26813e−009

Various data
Zoom ratio 7.52

|  | Wide angle | Intermediate | Telephoto |
|---|---|---|---|
| Focal length | 4.63 | 17.81 | 34.80 |
| F number | 2.28 | 4.07 | 7.00 |
| Field angle | 35.48 | 12.27 | 6.35 |
| Image height | 3.30 | 3.88 | 3.88 |
| Total lens length | 55.77 | 44.79 | 56.96 |
| BF | 0.64 | 0.64 | 0.64 |
| d4 | 29.74 | 3.84 | 1.10 |
| d13 | 2.29 | 6.66 | 10.68 |
| d16 | 3.05 | 9.33 | 22.60 |
| d18 | 2.01 | 6.27 | 3.91 |

Zoom lens unit data

| Unit | First surface | Focal length |
|---|---|---|
| 1 | 1 | −13.22 |
| 2 | 5 | 11.50 |
| 3 | 14 | −21.06 |
| 4 | 17 | 17.92 |
| 5 | 19 | ∞ |

Numerical Embodiment 3

Unit: mm
Surface data

| Surface No. | r | d | nd | vd |
|---|---|---|---|---|
| 1* | −49.193 | 1.00 | 1.84862 | 40.0 |
| 2* | 6.764 | 2.69 | | |
| 3 | 13.411 | 1.80 | 1.92286 | 18.9 |
| 4 | 32.050 | (Variable) | | |
| 5 (Stop) | (SP1) ∞ | −0.60 | | |
| 6* | 9.501 | 2.20 | 1.84862 | 40.0 |
| 7* | 35732.396 | 0.38 | | |
| 8 | 8.427 | 2.40 | 1.74320 | 49.3 |
| 9 | −11.098 | 0.90 | 2.00330 | 28.3 |
| 10 | 5.837 | 1.30 | | |
| 11 | 25.654 | 1.40 | 1.77250 | 49.6 |
| 12 | −16.140 | 0.00 | | |
| 13 (SP2) | ∞ | (Variable) | | |
| 14 (SP3) | ∞ | 0.10 | | |
| 15 | −106.989 | 0.65 | 1.88300 | 40.8 |
| 16 | 35.455 | (Variable) | | |
| 17 | 15.245 | 1.80 | 1.77250 | 49.6 |
| 18 | −133.537 | (Variable) | | |
| 19 | ∞ | 1.30 | 1.51633 | 64.1 |
| 20 | ∞ | 0.64 | | |
| Image plane | ∞ | | | |

Aspherical surface data
First surface

K = −1.02460e+002    A4 = −5.95762e−008    A6 = −1.59125e−006
A8 = 2.18339e−008    A10 = −6.54406e−011

Second surface

K = −1.37079e+000    A4 = 3.17924e−004    A6 = −9.03382e−007
A8 = −1.05501e−007   A10 = 1.83889e−009

-continued

Sixth surface

K = −3.29727e−002    A4 = −8.51747e−005    A6 = −5.47206e−007
A8 = −1.00077e−008   A10 = −1.23893e−009

Seventh surface

K = −5.28181e+006    A4 = −4.86617e−005    A6 = −2.25856e−006
A8 = 5.22847e−008    A10 = −2.81583e−009

Various data
Zoom ratio 7.57

|  | Wide angle | Intermediate | Telephoto |
|---|---|---|---|
| Focal length | 4.60 | 17.75 | 34.80 |
| F number | 2.06 | 3.83 | 7.00 |
| Field angle | 35.67 | 12.32 | 6.35 |
| Image height | 3.30 | 3.88 | 3.88 |
| Total lens length | 49.36 | 43.91 | 58.12 |
| BF | 0.64 | 0.64 | 0.64 |
| d4 | 23.62 | 2.53 | 1.11 |
| d13 | 1.32 | 10.70 | 13.95 |
| d16 | 4.45 | 6.79 | 22.58 |
| d18 | 2.01 | 5.93 | 2.53 |

Zoom lens unit data

| Unit | First surface | Focal length |
|---|---|---|
| 1 | 1 | −11.20 |
| 2 | 5 | 11.20 |
| 3 | 14 | −30.09 |
| 4 | 17 | 17.81 |
| 5 | 19 | ∞ |

Numerical Embodiment 4

Unit: mm
Surface data

| Surface No. | r | d | nd | vd |
|---|---|---|---|---|
| 1* | −162.863 | 1.30 | 1.80440 | 39.6 |
| 2* | 7.102 | 3.49 | | |
| 3 | 13.662 | 2.10 | 1.92286 | 18.9 |
| 4 | 27.056 | (Variable) | | |
| 5 (Stop) | (SP1) ∞ | −0.60 | | |
| 6* | 10.394 | 2.50 | 1.77250 | 49.6 |
| 7* | −372.713 | 0.38 | | |
| 8 | 8.427 | 2.75 | 1.69680 | 55.5 |
| 9 | −34.261 | 0.85 | 2.00330 | 28.3 |
| 10 | 6.100 | 1.30 | | |
| 11 | 32.425 | 1.40 | 1.65844 | 50.9 |
| 12 | −14.259 | 0.00 | | |
| 13 (SP2) | ∞ | (Variable) | | |
| 14 | −17.191 | 0.60 | 1.77250 | 49.6 |
| 15 | 269.381 | 0.20 | | |
| 16 (SP3) | ∞ | (Variable) | | |
| 17 | 14.955 | 2.00 | 1.69680 | 55.5 |
| 18 | −41.512 | (Variable) | | |
| 19 | ∞ | 1.30 | 1.51633 | 64.1 |
| 20 | ∞ | 0.64 | | |
| Image plane | ∞ | | | |

Aspherical surface data
First surface

K = −1.47877e+003    A4 = 1.36810e−004    A6 = −1.41587e−006
A8 = 7.02723e−009    A10 = −2.77548e−011

-continued

Second surface

K = −1.10984e+000  A4 = 3.86968e−004  A6 = −1.24593e−006
A8 = 3.82518e−008  A10 = 8.93700e−010

Sixth surface

K = −8.39199e−002  A4 = −6.60935e−005  A6 = 2.34190e−006
A8 = 4.23575e−010  A10 = 1.40642e−009

Seventh surface

K = −1.15935e+004  A4 = −2.29947e−005  A6 = 3.17467e−006
A8 = 8.28630e−008  A10 = −1.02169e−009

Various data
Zoom ratio 7.51

|  | Wide angle | Intermediate | Telephoto |
|---|---|---|---|
| Focal length | 4.63 | 15.94 | 34.80 |
| F number | 2.32 | 3.92 | 7.00 |
| Field angle | 35.47 | 13.66 | 6.35 |
| Image height | 3.30 | 3.88 | 3.88 |
| Total lens length | 61.62 | 46.43 | 53.95 |
| BF | 0.64 | 0.64 | 0.64 |
| d4 | 33.58 | 5.90 | 0.91 |
| d13 | 2.80 | 7.75 | 16.47 |
| d16 | 3.00 | 7.89 | 14.35 |
| d18 | 2.02 | 4.69 | 2.00 |

Zoom lens unit data

| Unit | First surface | Focal length |
|---|---|---|
| 1 | 1 | −13.88 |
| 2 | 5 | 12.48 |
| 3 | 14 | −20.90 |
| 4 | 17 | 16.01 |
| 5 | 19 | ∞ |

Numerical Embodiment 5

Unit: mm
Surface data

| Surface No. | r | d | nd | vd |
|---|---|---|---|---|
| 1* | −153.671 | 1.30 | 1.84862 | 40.0 |
| 2* | 7.346 | 2.71 | | |
| 3 | 12.755 | 2.00 | 1.94595 | 18.0 |
| 4 | 24.318 | (Variable) | | |
| 5 (Stop) (SP1) | ∞ | −0.60 | | |
| 6* | 9.266 | 2.50 | 1.76414 | 49.0 |
| 7* | 173.548 | 0.38 | | |
| 8 | 8.427 | 2.00 | 1.80400 | 46.6 |
| 9 | −27.461 | 0.60 | 2.00330 | 28.3 |
| 10 | 5.951 | 1.30 | | |
| 11 | 31.778 | 1.50 | 1.74400 | 44.8 |
| 12 | −24.032 | 0.00 | | |
| 13 (SP2) | ∞ | (Variable) | | |
| 14 | −12.016 | 0.65 | 1.70154 | 41.2 |
| 15 | −14.329 | −0.25 | | |
| 16 (SP3) | ∞ | (Variable) | | |
| 17 | 30.345 | 1.65 | 1.60311 | 60.6 |
| 18 | −64.644 | (Variable) | | |
| 19 | ∞ | 1.30 | 1.51633 | 64.1 |
| 20 | ∞ | 0.64 | | |
| Image plane | ∞ | | | |

Aspherical surface data
First surface

K = 2.02548e+002  A4 = 3.42716e−005  A6 = −3.35143e−007
A8 = 4.20559e−009  A10 = −9.55270e−012

Second surface

K = −1.47758e+000  A4 = 3.24817e−004  A6 = −6.25951e−007
A8 = 7.04855e−009  A10 = 1.02120e−010

Sixth surface

K = 2.24452e−001  A4 = −7.39348e−005  A6 = −5.04601e−007
A8 = 2.72153e−008  A10 = 3.30535e−009

Seventh surface

K = −1.06849e+002  A4 = 5.38265e−005  A6 = 3.80638e−007
A8 = 1.10839e−007  A10 = 3.07414e−009

Various data
Zoom ratio 7.52

|  | Wide angle | Intermediate | Telephoto |
|---|---|---|---|
| Focal length | 4.63 | 18.80 | 34.80 |
| F number | 2.24 | 4.34 | 7.00 |
| Field angle | 35.48 | 11.65 | 6.35 |
| Image height | 3.30 | 3.88 | 3.88 |
| Total lens length | 56.93 | 47.64 | 60.77 |
| BF | 0.64 | 0.64 | 0.64 |
| d4 | 30.33 | 4.83 | 1.74 |
| d13 | 1.28 | 7.75 | 11.10 |
| d16 | 4.09 | 12.29 | 27.74 |
| d18 | 3.55 | 5.10 | 2.50 |

Zoom lens unit data

| Unit | First surface | Focal length |
|---|---|---|
| 1 | 1 | −13.26 |
| 2 | 5 | 12.81 |
| 3 | 14 | −120.00 |
| 4 | 17 | 34.47 |
| 5 | 19 | ∞ |

TABLE 1

| | Conditional Expression | | More desirable | | | | | | |
|---|---|---|---|---|---|---|---|---|---|
| | Lower limit value | Upper limit value | Lower limit value | Upper limit value | Embodiment 1 | Embodiment 2 | Embodiment 3 | Embodiment 4 | Embodiment 5 |
| Conditional Expression 1 | 4.50 | 30.00 | 4.505 | 26.000 | 11.32 | 4.55 | 6.55 | 4.51 | 25.92 |
| fW | | | | | 4.63 | 4.63 | 4.60 | 4.63 | 4.63 |
| f3 | | | | | −52.43 | −21.06 | −30.09 | −20.90 | −120.00 |
| Conditional Expression 2 | 5.00 | 10.00 | 5.30 | 7.30 | 7.18 | 6.44 | 6.80 | 5.40 | 7.00 |
| fW | | | | | 4.63 | 4.63 | 4.60 | 4.63 | 4.63 |
| m2 | | | | | −33.27 | −29.83 | −31.27 | −25.00 | −32.42 |

TABLE 1-continued

|  | Conditional Expression | | More desirable | | | | | | |
| --- | --- | --- | --- | --- | --- | --- | --- | --- | --- |
|  | Lower limit value | Upper limit value | Lower limit value | Upper limit value | Embodiment 1 | Embodiment 2 | Embodiment 3 | Embodiment 4 | Embodiment 5 |
| Conditional Expression 3 | 0.95 | 1.20 | 0.99 | 1.16 | 1.02 | 1.15 | 1.00 | 1.11 | 1.04 |
| f1 |  |  |  |  | −13.24 | −13.22 | −11.20 | −13.88 | −13.26 |
| f2 |  |  |  |  | 12.93 | 11.50 | 11.20 | 12.48 | 12.81 |
| Conditional Expression 4 | 0.10 | 0.80 | 0.105 | 0.620 | 0.25 | 0.55 | 0.37 | 0.60 | 0.11 |
| f2 |  |  |  |  | 12.93 | 11.50 | 11.20 | 12.48 | 12.81 |
| f3 |  |  |  |  | −52.43 | −21.06 | −30.09 | −20.90 | −120.00 |
| Conditional Expression 5 | 1.00 | 4.00 | 1.12 | 3.49 | 1.97 | 1.18 | 1.69 | 1.31 | 3.48 |
| f3 |  |  |  |  | −52.43 | −21.06 | −30.09 | −20.90 | −120.00 |
| f4 |  |  |  |  | 26.68 | 17.92 | 17.81 | 16.01 | 34.47 |
| Conditional Expression 6 | 2.50 | 6.00 | 2.70 | 5.50 | 4.55 | 2.82 | 3.65 | 4.01 | 5.33 |
| β2W |  |  |  |  | −0.38 | −0.32 | −0.40 | −0.31 | −0.38 |
| β2T |  |  |  |  | −2.25 | −1.59 | −2.17 | −1.71 | −2.34 |
| β3W |  |  |  |  | 1.21 | 1.46 | 1.35 | 1.47 | 1.11 |
| β3T |  |  |  |  | 1.60 | 2.58 | 1.98 | 2.02 | 1.30 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-294301, filed Dec. 25, 2009, which is hereby incorporated by reference herein in its entirety.

What is claimed is:

1. A zoom lens, comprising, in order from an object side to an image side:
   a first lens unit having a negative refractive power;
   a second lens unit having a positive refractive power;
   a third lens unit having a negative refractive power; and
   a fourth lens unit having a positive refractive power,
   wherein intervals between the first lens unit, the second lens unit, the third lens unit, and the fourth lens unit are changed during zooming, and
   wherein the following conditions are satisfied:

$4.5 < |f3/fW| < 30.0$; and $5.0 < m2/fW < 10.0$, where fW indicates a focal length of the entire zoom lens at a wide angle end, f3 indicates a focal length of the third lens unit, and m2 indicates a movement amount of the second lens unit during zooming from the wide angle end to a telephoto end.

2. A zoom lens according to claim 1, wherein during the zooming from the wide angle end to the telephoto end, the first lens unit moves along a locus convex toward the image side, and the second lens unit and the third lens unit move to the object side.

3. A zoom lens according to claim 1, wherein the second lens unit comprises, in order from the object side to the image side, a positive lens, a positive lens, a negative lens, and a positive lens.

4. A zoom lens according to claim 1, wherein the second lens unit comprises, in order from the object side to the image side, a positive lens having a convex surface facing toward the object side, a positive lens having a convex surface facing toward the object side, a negative lens having a concave surface facing toward the image side, and a positive lens of which both lens surfaces are convex.

5. A zoom lens according to claim 1,
   wherein the second lens unit comprises a positive lens closest to the object side, and
   wherein the positive lens includes both lens surfaces each having an aspherical shape.

6. A zoom lens according to claim 1, wherein the third lens unit consists of a single negative lens.

7. A zoom lens according to claim 1, wherein the following condition is satisfied:

$0.95 < |f1/f2| < 1.20$, where f1 indicates a focal length of the first lens unit and f2 indicates a focal length of the second lens unit.

8. A zoom lens according to claim 1, wherein the following condition is satisfied:

$0.1 < |f2/f3| < 0.8$, where f2 indicates a focal length of the second lens unit.

9. A zoom lens according to claim 1, wherein the following condition is satisfied:

$1.0 < |f3/f4| < 4.0$, where f4 indicates a focal length of the fourth lens unit.

10. A zoom lens according to claim 1, wherein the following condition is satisfied:

$2.5 < (\beta 2T \cdot \beta 3W)/(\beta 2W \cdot \beta 3T) < 6.0$, where β2W and β2T indicate imaging magnifications of the second lens unit at the wide angle end and at the telephoto end, respectively, and β3W and β3T indicate imaging magnifications of the third lens unit at the wide angle end and at the telephoto end, respectively.

11. A zoom lens according to claim 1, wherein during the zooming from the wide angle end to the telephoto end, the fourth lens unit moves along a locus convex toward the object side.

12. A zoom lens according to claim 1, wherein the first lens unit consists of, in order from the object side to the image side, a negative lens and a positive lens.

13. A zoom lens according to claim 1, further comprising a stop which has a fixed aperture diameter and is located closer to the image side with respect to an image side lens surface of a lens of the second lens unit closest to the image side.

14. A zoom lens according to claim 1, wherein the third lens unit comprises a stop having a fixed aperture diameter.

15. A zoom lens according to claim 1, wherein the fourth lens unit is moved to the object side for focusing from an infinite object to a near object.

16. An image pickup apparatus, comprising:

the zoom lens according to claim 1; and a photoelectric transducer for receiving a light image formed by the zoom lens.

* * * * *